US010979943B2

(12) United States Patent
Yang

(10) Patent No.: US 10,979,943 B2
(45) Date of Patent: Apr. 13, 2021

(54) METHOD AND DEVICE FOR ACQUIRING TERMINAL CONTEXT

(71) Applicant: Guangdong OPPO Mobile Telecommunications Corp., Ltd., Guangdong (CN)

(72) Inventor: Ning Yang, Dongguan (CN)

(73) Assignee: Guangdong OPPO Mobile Telecommunications Corp., Ltd., Dongguan (CN)

( * ) Notice: Subject to any disclaimer, the term of this patent is extended or adjusted under 35 U.S.C. 154(b) by 0 days.

(21) Appl. No.: 16/883,707

(22) Filed: May 26, 2020

(65) Prior Publication Data

US 2020/0288356 A1 Sep. 10, 2020

Related U.S. Application Data

(63) Continuation of application No. PCT/CN2017/115046, filed on Dec. 7, 2017.

(51) Int. Cl.
*H04W 36/00* (2009.01)
*H04W 76/15* (2018.01)
(Continued)

(52) U.S. Cl.
CPC ... *H04W 36/0033* (2013.01); *H04W 36/0058* (2018.08); *H04W 36/0069* (2018.08);
(Continued)

(58) Field of Classification Search
None
See application file for complete search history.

(56) References Cited

U.S. PATENT DOCUMENTS 10,143,019 B2 * 11/2018 Xu ............... H04L 41/0813
2015/0215824 A1 * 7/2015 Nigam ........... H04W 36/0069
370/331
(Continued)

FOREIGN PATENT DOCUMENTS

CN 105580434 A 5/2016
CN 105981438 A 9/2016
(Continued)

OTHER PUBLICATIONS

International Application No. PCT/CN2017/115046, International search report, dated Aug. 27, 2018, 2 pages.
(Continued)

*Primary Examiner* — Hassan A Phillips
*Assistant Examiner* — Gautam Sharma
(74) *Attorney, Agent, or Firm* — Kilpatrick Townsend & Stockton LLP

(57) ABSTRACT

A user equipment context obtaining method and apparatus, and a computer storage medium are provided. The method includes obtaining, by a first network node from a second network node, a user equipment context of a user equipment within the second network node. The method further includes sending, by the first network node, a user equipment context of the user equipment within the first network node and the user equipment context of the user equipment within the second network node to a third network node. In some cases, the first network node and the second network node are a master node and a secondary node in a first dual connectivity network respectively, and the third network node is a master node in a second dual connectivity network.

20 Claims, 6 Drawing Sheets

(51) Int. Cl.
*H04W 36/26* (2009.01)
*H04W 84/18* (2009.01)
(52) U.S. Cl.
CPC .......... *H04W 36/26* (2013.01); *H04W 76/15* (2018.02); *H04W 84/18* (2013.01)

(56) References Cited

U.S. PATENT DOCUMENTS

| | | | | |
|---|---|---|---|---|
| 2017/0111482 | A1* | 4/2017 | Mishra | H04W 92/02 |
| 2017/0134998 | A1 | 5/2017 | Xu et al. | |
| 2017/0195935 | A1 | 7/2017 | Xu et al. | |
| 2018/0160436 | A1* | 6/2018 | Park | H04W 72/10 |
| 2019/0150042 | A1* | 5/2019 | Srivastava | H04W 36/08 |
| | | | | 455/436 |
| 2019/0166592 | A1* | 5/2019 | Yang | H04W 72/044 |
| 2019/0174311 | A1* | 6/2019 | Hayashi | H04L 9/0866 |

FOREIGN PATENT DOCUMENTS

| | | |
|---|---|---|
| CN | 106465203 A | 2/2017 |
| CN | 106576381 A | 4/2017 |
| CN | 106851750 A | 6/2017 |
| EP | 3416423 A1 | 12/2018 |
| WO | 2017022167 A1 | 5/2018 |
| WO | 2019061189 A1 | 4/2019 |

OTHER PUBLICATIONS

3GPP Technical Specification 37.340 V1.2.2 Release 15, issued on Dec. 2017.

The extended European search report for European application 17934141.7 dated Nov. 11, 2020.

Huawei et al., "Stage 2 for clarifications on Inter-MN handover with SN change", 3GPP Draft, R3-174913, vol. RAN NG3, Reno, Nevada, Nov. 27-Dec. 1, 2017.

NEC, "Stage-2 CR: X2-based Context-fetch", 3GPP Draft, R3-160270_X2_STAGE2_CR, vol. Ran WG3, St Julian's, Malta, Feb. 15-19, 2016.

ZTE, "Xn Functions", 3GPP Draft, R3-132202, vol. RAN WG3, San Francisco, CA, USA, Nov. 11-15, 2013.

* cited by examiner

METHOD AND DEVICE FOR ACQUIRING TERMINAL CONTEXT

CROSS-REFERENCES TO RELATED APPLICATIONS

This application is a continuation of and claims priority to International Patent Application PCT/CN2017/115046, filed Dec. 7, 2017, the contents of which is hereby incorporated by reference in its entirety.

BACKGROUND OF THE INVENTION

Technical Field

The present invention relates to the field of wireless communications technologies, and in particular, to a user equipment (UE) context obtaining method and apparatus, and a computer storage medium.

Related Art

The 3rd Generation Partnership Project (3GPP) international organization for standardization initiated research and development of the $5^{th}$ Generation (5G) mobile communications technology to meet popular demand for high rate, low delay, high-speed mobility and high energy efficiency telecommunications service. 5G is also seen as a means to adapt to the diversity and complexity of services in the future.

Main application scenarios of the 5G mobile communications technology include Enhanced Mobile Broadband (eMBB), Ultra Reliable Low Latency Communication (URLLC), and massive Machine Type Communication (mMTC).

The 5G mobile communications technology is also called a new radio (NR) technology. During early deployment of the NR, it was difficult to achieve complete NR coverage. Therefore, typical network coverage is a combination of Long Term Evolution (LTE) coverage and NR coverage. In addition, to protect an early investment in the LTE of a mobile operator, an operation mode of tight interworking between the LTE and the NR is provided. In a dual connectivity (DC) architecture, two network nodes provide services for a UE, in which one network node is a master node (MN), and the other is a secondary node (SN).

During a UE handover process, UE contexts of a source cell are generally sent to a target cell, and the target cell performs a radio resource control (RRC) configuration according to the UE contexts of the source cell. However, in an EN-DC architecture, the UE contexts are stored in two locations: an MN and an SN. The MN does not know the UE context on the SN side. Therefore, in the UE handover process, a UE context transferred by a source MN to a target MN does not include the UE context on the SN side. Consequently, the target MN cannot configure a reasonable radio resource for the UE, and meanwhile, the UE handover may fail.

SUMMARY OF THE INVENTION

To solve the foregoing technical problem, embodiments of the present invention provide a user equipment context obtaining method and apparatus, and a computer storage medium.

The user equipment context obtaining method provided by the embodiments of the present invention includes obtaining, by a first network node from a second network node, a user equipment context of a user equipment within the second network node. In some embodiments, the method further includes sending, by the first network node, a user equipment context of the user equipment within the first network node and the user equipment context of the user equipment within the second network node to a third network node, where the first network node and the second network node are a master node and a secondary node in a first dual connectivity network respectively, and the third network node is a master node in a second dual connectivity network.

In some embodiments of the present invention, the obtaining, by a first network node from a second network node, a user equipment context of a user equipment within the second network node includes obtaining, by the first network node, the user equipment context of the user equipment within the second network node from the second network node when the first network node determines that a user equipment handover needs to be triggered.

In some embodiments of the present invention, the method further includes receiving, by the first network node, a measurement report sent by the user equipment and determining, by the first network node, whether the user equipment handover needs to be triggered based on the measurement report.

In some embodiments of the present invention, the obtaining, by a first network node from a second network node, a user equipment context of a user equipment within the second network node includes sending, by the first network node, a user equipment context request message to the second network node. In some embodiments, obtaining a user equipment context of a user equipment within the second network node further includes receiving, by the first network node, the user equipment context of the user equipment within the second network node sent by the second network node.

In some embodiments of the present invention, the method further includes receiving, by the first network node, first resource configuration information and second resource configuration information sent by the third network node. In some embodiments, the method further includes sending, by the first network node, the first resource configuration information and the second resource configuration information to the user equipment, to trigger the user equipment handover, where the first resource configuration information is obtained by the third network node by allocating a resource to the user equipment according to the user equipment context of the user equipment within the first network node; the second resource configuration information is obtained by a fourth network node by allocating a resource to the user equipment according to the user equipment context of the user equipment within the second network node, and the fourth network is a secondary node in the second dual connectivity network.

A user equipment context obtaining method provided by the embodiments of the present invention includes receiving, by a third network node, a user equipment context of a user equipment within a first network node and a user equipment context of the user equipment within a second network node sent by the first network node. In some embodiments, the method further includes sending, by the third network node, the user equipment context of the user equipment within the second network node to a fourth network node, where the first network node and the second network node are a master node and a secondary node in a first dual connectivity network respectively, and the third network node and the fourth network node are a master node and a secondary node in a second dual connectivity network respectively.

In some embodiments of the present invention, the method further includes allocating, by the third network node, a resource to the user equipment according to the user equipment context of the user equipment within the first network node, to obtain first resource configuration information. In some embodiments, the method further includes receiving, by the third network node, second resource configuration information sent by the fourth network node, where the second resource configuration information is obtained by the fourth network node by allocating a resource to the user equipment according to the user equipment context of the user equipment within the second network node. In some embodiments, the method further includes sending, by the third network node, the first resource configuration information and the second resource configuration information to the first network node.

A user equipment context obtaining apparatus provided by the embodiments of the present invention includes an obtaining unit, configured to obtain, from a second network node, a user equipment context of a user equipment within a second network node and a first sending unit, configured to send a user equipment context of the user equipment within a first network node and the user equipment context of the user equipment within the second network node to a third network node, where the first network node and the second network node are a master node and a secondary node in a first dual connectivity network respectively, and the third network node is a master node in a second dual connectivity network.

In some embodiments of the present invention, the first sending unit is configured to obtain the user equipment context of the user equipment within the second network node from the second network node when it is determined that a user equipment handover needs to be triggered.

In some embodiments of the present invention, the apparatus further includes a first receiving unit, configured to receive a measurement report sent by the user equipment and a determining unit, configured to determine whether the user equipment handover needs to be triggered based on the measurement report.

In some embodiments of the present invention, the obtaining unit is configured to send a user equipment context request message to the second network node; and receive the user equipment context of the user equipment within the second network node sent by the second network node.

In some embodiments of the present invention, the apparatus further includes a second receiving unit, configured to receive first resource configuration information and second resource configuration information sent by the third network node and a second sending unit, configured to send the first resource configuration information and the second resource configuration information to the user equipment, to trigger the user equipment handover, where the first resource configuration information is obtained by the third network node by allocating a resource to the user equipment according to the user equipment context of the user equipment within the first network node; the second resource configuration information is obtained by a fourth network node by allocating a resource to the user equipment according to the user equipment context of the user equipment within the second network node, and the fourth network is a secondary node in the second dual connectivity network.

A user equipment context obtaining apparatus provided by the embodiments of the present invention includes a first receiving unit, configured to receive a user equipment context of a user equipment within a first network node and a user equipment context of the user equipment within a second network node sent by the first network node and a first sending unit, configured to send the user equipment context of the user equipment within the second network node to a fourth network node, where the first network node and the second network node are a master node and a secondary node in a first dual connectivity network respectively, and the third network node and the fourth network node are a master node and a secondary node in a second dual connectivity network respectively.

In some embodiments of the present invention, the apparatus further includes a resource allocation unit, configured to allocate a resource to the user equipment according to the user equipment context of the user equipment within the first network node, to obtain first resource configuration information a second receiving unit, configured to receive second resource configuration information sent by the fourth network node, where the second resource configuration information is obtained by the fourth network node by allocating a resource to the user equipment according to the user equipment context of the user equipment within the second network node and a second sending unit, configured to send the first resource configuration information and the second resource configuration information to the first network node.

A computer storage medium provided by the embodiments of the present invention stores a computer executable instruction, where the computer executable instruction, when executed by a processor, implements the foregoing user equipment context obtaining method.

In some embodiments of the present invention, a first network node obtains, from a second network node, a user equipment context of a user equipment within the second network node; and the first network node sends a user equipment context of the user equipment within the first network node and the user equipment context of the user equipment within the second network node to a third network node, where the first network node and the second network node are a master node and a secondary node in a first dual connectivity network respectively, and the third network node is a master node in a second dual connectivity network. By using the technical solution in the embodiments of the present invention, a source MN requests a context of a user equipment within a source SN, then sends all user equipment contexts (a user equipment context within the source MN and the user equipment context within the source SN) to a target MN, so that a target side (the target MN and a target SN) may generate new radio resource configuration information based on the user equipment contexts. Reasonable radio resources are configured for the user equipment, and a success probability of the user equipment handover is improved.

BRIEF DESCRIPTION OF THE DRAWINGS

The accompanying drawings described herein are used for providing a further understanding of the present invention and constitute a part of this application. Exemplary embodiments of the present invention and the description thereof are used for explaining the present invention, and do not constitute any improper limitation on the present invention.

DETAILED DESCRIPTION OF THE INVENTION

To provide a thorough understanding of the features and technical contents of the embodiments of the present invention, the implementation of the embodiments of the present invention is described in detail below with reference to the accompanying drawings. The accompanying drawings are only used for reference and description but are not intended to limit the embodiments of the present invention.

The technical solution of the embodiments of the present invention is mainly applied to a 5G mobile communications system. Certainly, the technical solution of the embodiments of the present invention is not limited to the 5G mobile communications system, and may further be applied to other types of mobile communications systems. Main application scenarios in the 5G mobile communications system are described as follows:

1) eMBB scenario: the purpose of eMBB is to enable a user to obtain multimedia contents, services and data, and service requirements of the eMBB grow rapidly. Because the eMBB may be deployed in different scenarios, for example, deployed indoor, in an urban area or in a rural area, service capabilities and requirements of the eMBB also differ greatly. Therefore, services need to be analyzed with reference to specific deployment scenarios.

2) URLLC scenario: Typical applications of the URLLC include: industrial automation, electrical automation, remote surgery operations, traffic safety, and the like.

3) mMTC scenario: Typical features of the mMTC include: a high connection density, a small data volume, a delay-tolerant service, low cost modules, a long life span, and the like.

In an operation mode of tight interworking between an LTE and an NR, an SN has its own signaling radio bearers (SRBs), that is, SRB3. Through the SRB3, management information and measurement information of scell in a slave cell group (SCG) may be configured.

In addition, an MN and the SN separately configure measurement configuration information for a UE. Specifically, the MN sends measurement configuration information to the UE through an RRC message in the LTE, and the UE reports a measurement report related to the measurement configuration information to the MN. In this configuration, all cells in a main cell group (MCG) are considered as serving cells, and other cells (including the cells in the SCG) are considered as neighboring cells. The SN sends measurement configuration information to the UE through an RRC message in the NR, and the UE reports a measurement report related to the measurement configuration information to the SN. In this configuration, the cells in the SCG are considered as serving cells, and other cells (including the cells in the MCG) are considered as neighboring cells.

Figure 1:
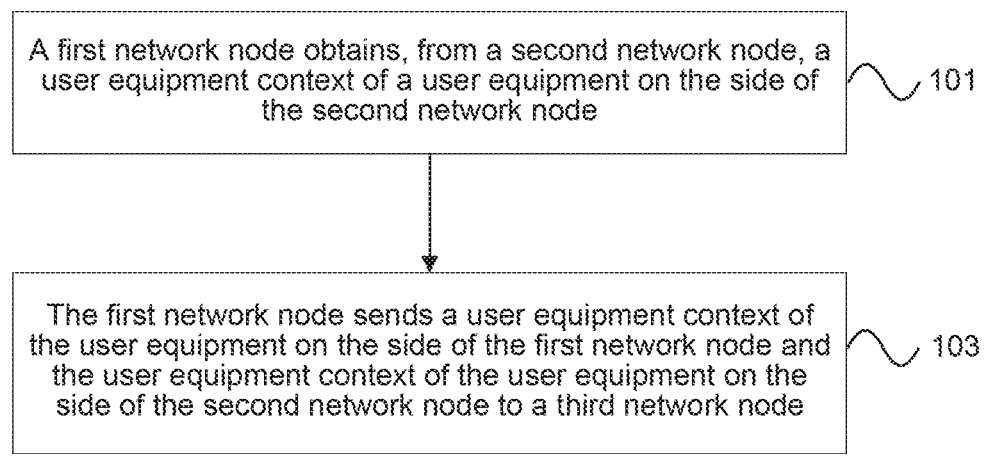
FIG. 1 is a first schematic flowchart of a user equipment context obtaining method according to an embodiment of the present invention.

FIG. 1 is a first schematic flowchart of a user equipment context obtaining method according to an embodiment of the present invention. In this embodiment, a first network node and a second network node are a master node and a secondary node in a first dual connectivity network respectively, and a third network node and a fourth network node are a master node and a secondary node in a second dual connectivity network respectively. As shown in FIG. 1, the user equipment context obtaining method includes the following steps:

Step 101: A first network node obtains, from a second network node, a user equipment context of a user equipment within the second network node.

Figure 2:
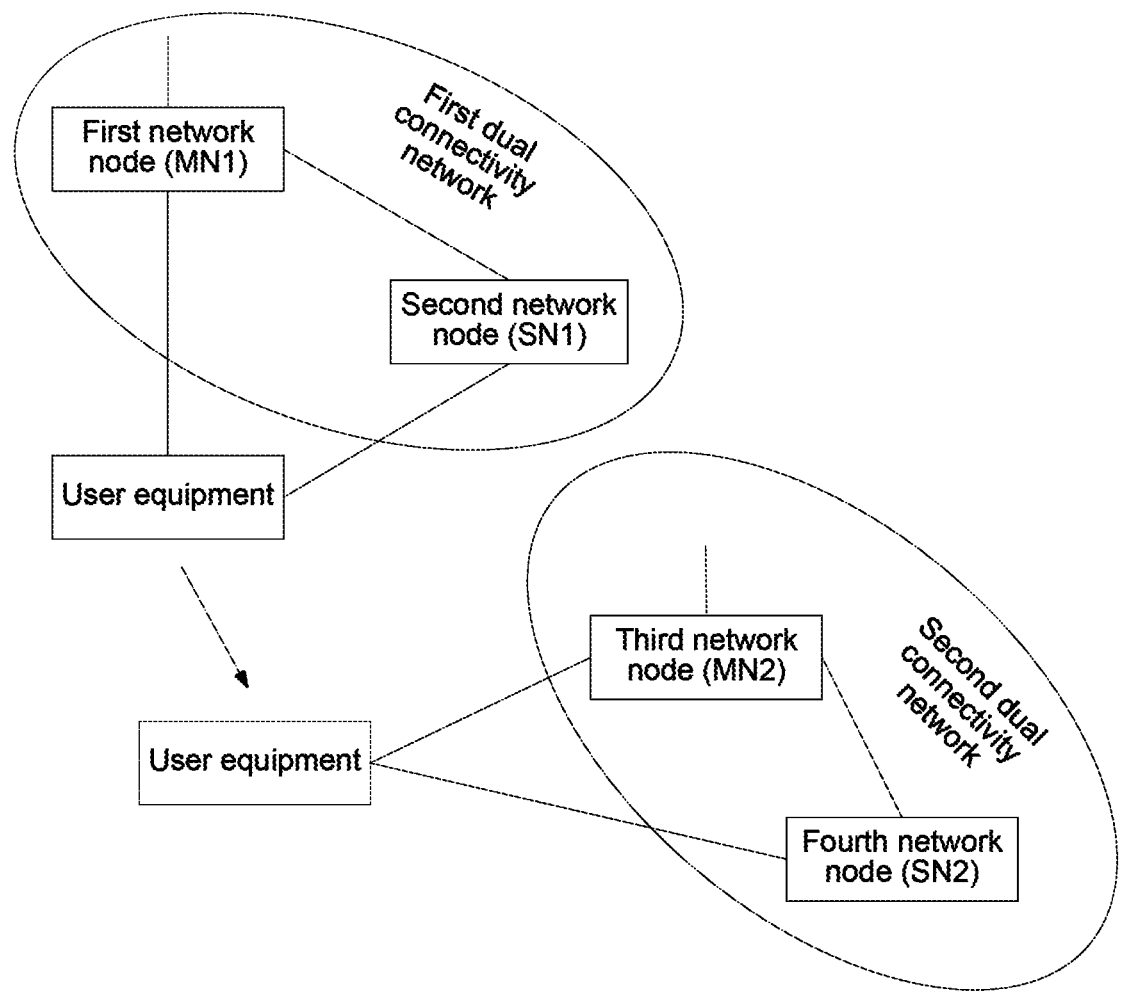
FIG. 2 is a diagram of a system architecture according to an embodiment of the present invention.

Referring to FIG. 2, the first dual connectivity network includes the first network node and the second network node, where the first network node is the master node in the first dual connectivity network, which is called MN1, and the second network node is the secondary node in the first dual connectivity network, which is called SN1. In the architecture of the first dual connectivity network, the first network node and the second network node may serve the user equipment at the same time. The second dual connectivity network includes the third network node and the fourth network node, where the third network node is the master node in the second dual connectivity network, which is called MN2, and the fourth network node is the secondary node in the second dual connectivity network, which is called SN2. In the architecture of the second dual connectivity network, the third network node and the fourth network node may serve the user equipment at the same time. In this embodiment of the present invention, the network node may be a base station, and base station types corresponding to different network nodes may be the same, or may be different.

It is assumed that the network nodes currently serving the user equipment are the first network node and the second network node. In this case, user equipment contexts are stored in the following two locations: the first network node and the second network node.

When determining that a user equipment handover needs to be triggered, the first network node obtains the user equipment context of the user equipment within the second network node from the second network node.

In an implementation, the first network node receives a measurement report sent by the user equipment, and determines whether the user equipment handover needs to be triggered based on the measurement report.

In this embodiment of the present invention, that the first network node obtains the user equipment context of the user equipment within the second network node from the second network node is specifically implemented through the following process:

1) the first network node sends a user equipment context request message to the second network node; and 2) the first network node receives the user equipment context of the user equipment within the second network node sent by the second network node.

Step 102: The first network node sends a user equipment context of the user equipment within the first network node and the user equipment context of the user equipment within the second network node to a third network node.

In this embodiment of the present invention, after the first network node sends the user equipment context of the user equipment within the first network node and the user equipment context of the user equipment within the second network node to the third network node, the third network node sends the user equipment context of the user equipment within the second network node to the fourth network node. Then, the third network node allocates a resource to the user equipment according to the user equipment context of the user equipment within the first network node, to obtain first resource configuration information; the fourth network node allocates a resource to the user equipment according to the user equipment context of the user equipment within the second network node, to obtain second resource configuration information. The third network node obtains the second resource configuration information from the fourth network node, and sends the first resource configuration information and the second resource configuration information to the first network node.

The first network node receives the first resource configuration information and the second resource configuration information sent by the third network node, and sends the first resource configuration information and the second resource configuration information to the user equipment, to trigger the user equipment handover.

Figure 3:
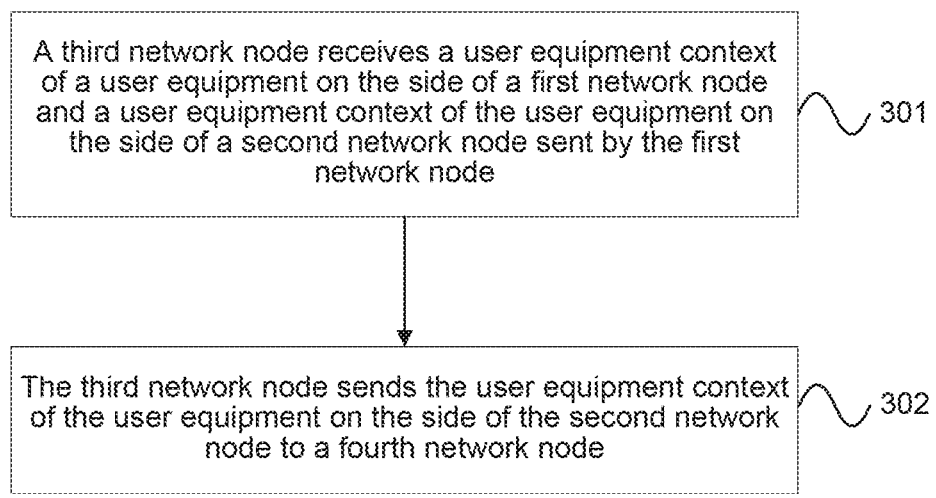
FIG. 3 is a second schematic flowchart of a user equipment context obtaining method according to an embodiment of the present invention.

FIG. 3 is a second schematic flowchart of a user equipment context obtaining method according to an embodiment of the present invention. In this embodiment, a first network node and a second network node are a master node and a secondary node in a first dual connectivity network respectively, and a third network node and a fourth network node are a master node and a secondary node in a second dual connectivity network respectively. As shown in FIG. 3, the user equipment context obtaining method includes the following steps:

Step 301: A third network node receives a user equipment context of a user equipment within a first network node and a user equipment context of the user equipment within a second network node sent by the first network node.

Referring to FIG. 2, the first dual connectivity network includes the first network node and the second network node, where the first network node is the master node in the first dual connectivity network, which is called MN1, and the second network node is the secondary node in the first dual connectivity network, which is called SN1. In the architecture of the first dual connectivity network, the first network node and the second network node may serve the user equipment at the same time. The second dual connectivity network includes the third network node and the fourth network node, where the third network node is the master node in the second dual connectivity network, which is called MN2, and the fourth network node is the secondary node in the second dual connectivity network, which is called SN2. In the architecture of the second dual connectivity network, the third network node and the fourth network node may serve the user equipment at the same time. In this embodiment of the present invention, the network node may be a base station, and base station types corresponding to different network nodes may be the same, or may be different.

It is assumed that the network nodes currently serving the user equipment are the first network node and the second network node. In this case, user equipment contexts are stored in the following two locations: the first network node and the second network node.

When determining that a user equipment handover needs to be triggered, the first network node obtains the user equipment context of the user equipment within the second network node from the second network node. The third network node receives the user equipment context of the user equipment within the first network node and the user equipment context of the user equipment within the second network node sent by the first network node.

Step 302: The third network node sends the user equipment context of the user equipment within the second network node to a fourth network node.

In this embodiment of the present invention, the third network node allocates a resource to the user equipment according to the user equipment context of the user equipment within the first network node, to obtain first resource configuration information; the fourth network node allocates a resource to the user equipment according to the user equipment context of the user equipment within the second network node, to obtain second resource configuration information. The third network node receives the second resource configuration information sent by the fourth network node. The third network node sends the first resource configuration information and the second resource configuration information to the first network node. The first network node sends the first resource configuration information and the second resource configuration information to the user equipment, to trigger the user equipment handover.

The following describes the technical solution of the embodiments of the present invention with reference to FIG. 2. In FIG. 2, MN1 is a source MN in a handover process, SN1 is a source SN in the handover process, MN2 is a target MN in the handover process, and SN2 is a target SN in the handover process. A process of obtaining the user equipment context is as follows:

1) MN1 receives a measurement report sent by the user equipment, and determines that a user equipment handover needs to be triggered.

2) MN1 sends a user equipment context request message to SN1, and SN1 sends a user equipment context of the user equipment within SN1 to MN1.

3) MN1 sends a user equipment context of the user equipment within MN1 and the user equipment context of the user equipment within SN1 to MN2.

4) MN2 sends the user equipment context within SN1 to SN2.

5) SN2 allocates a resource to the user equipment according to the user equipment context within SN1, and sends second resource configuration information to MN2.

6) MN2 allocates a resource to the user equipment according to the user equipment context of the user equipment within MN1, and sends first resource configuration information and the second resource configuration information within SN2 side to MN1.

7) MN1 sends the first resource configuration information and the second resource configuration information sent by MN2 to the user equipment, to trigger the user equipment handover.

Figure 4:
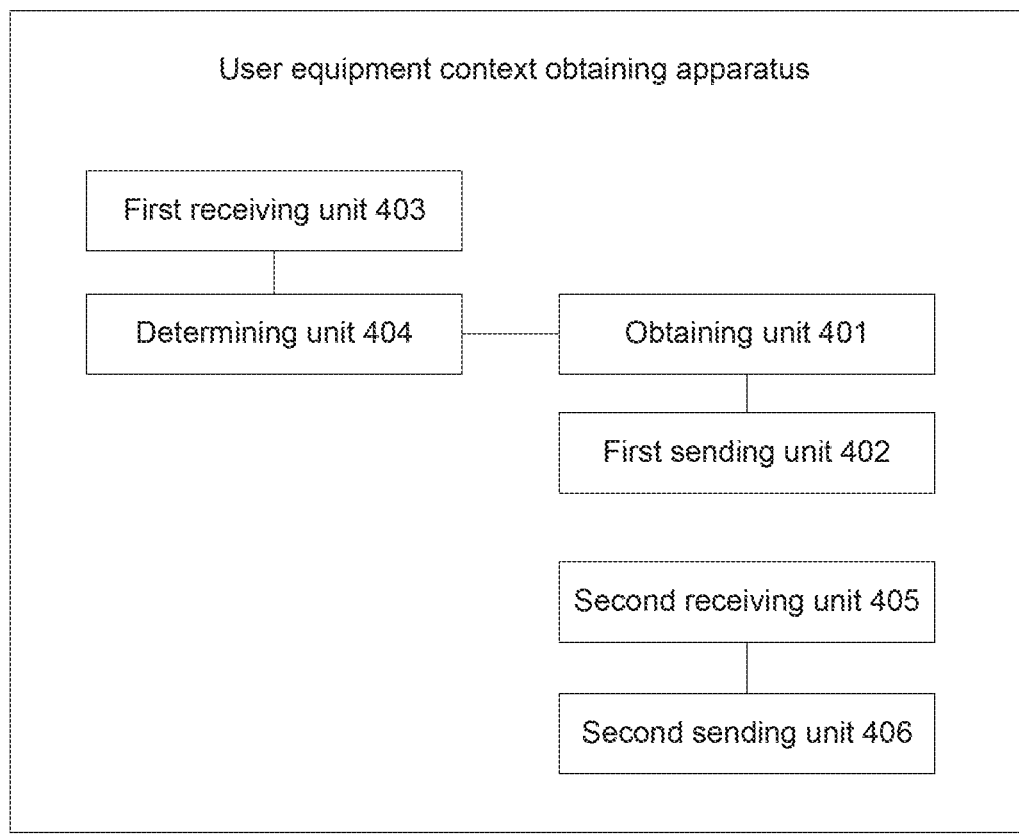
FIG. 4 is a first schematic structural diagram of a user equipment context obtaining apparatus according to an embodiment of the present invention.

FIG. 4 is a first schematic structural diagram of a user equipment context obtaining apparatus according to an embodiment of the present invention. As shown in FIG. 4, the apparatus includes an obtaining unit 401, configured to obtain, from a second network node, a user equipment context of a user equipment within the second network node and a first sending unit 402, configured to send a user equipment context of the user equipment within a first network node and the user equipment context of the user equipment within the second network node to a third network node, where the first network node and the second network node are a master node and a secondary node in a first dual connectivity network respectively, and the third network node is a master node in a second dual connectivity network.

In an implementation, the first sending unit 402 is configured to obtain the user equipment context of the user equipment within the second network node from the second network node when it is determined that a user equipment handover needs to be triggered.

In an implementation, the apparatus further includes a first receiving unit 403, configured to receive a measurement report sent by the user equipment and a determining unit 404, configured to determine whether the user equipment handover needs to be triggered based on the measurement report.

In an implementation, the obtaining unit 401 is configured to send a user equipment context request message to the second network node, and receive the user equipment context of the user equipment within the second network node sent by the second network node.

In an implementation, the apparatus further includes a second receiving unit 405, configured to receive first resource configuration information and second resource configuration information sent by the third network node and a second sending unit 406, configured to send the first resource configuration information and the second resource configuration information to the user equipment, to trigger the user equipment handover. In some embodiments, the first resource configuration information is obtained by the third network node by allocating a resource to the user equipment according to the user equipment context of the user equipment within the first network node; the second resource configuration information is obtained by a fourth network node by allocating a resource to the user equipment according to the user equipment context of the user equipment within the second network node, and the fourth network is a secondary node in the second dual connectivity network.

In the foregoing solution, the user equipment context obtaining apparatus may be applied to the side of the first network node. A person skilled in the art should understand that, the foregoing user equipment context obtaining apparatus according to the embodiments of the present invention may be understood with reference to related descriptions of the foregoing user equipment context obtaining method. In actual applications, functions of the units in the user equipment context obtaining apparatus may be implemented by modules with a processing function, for example, a processor.

Figure 5:
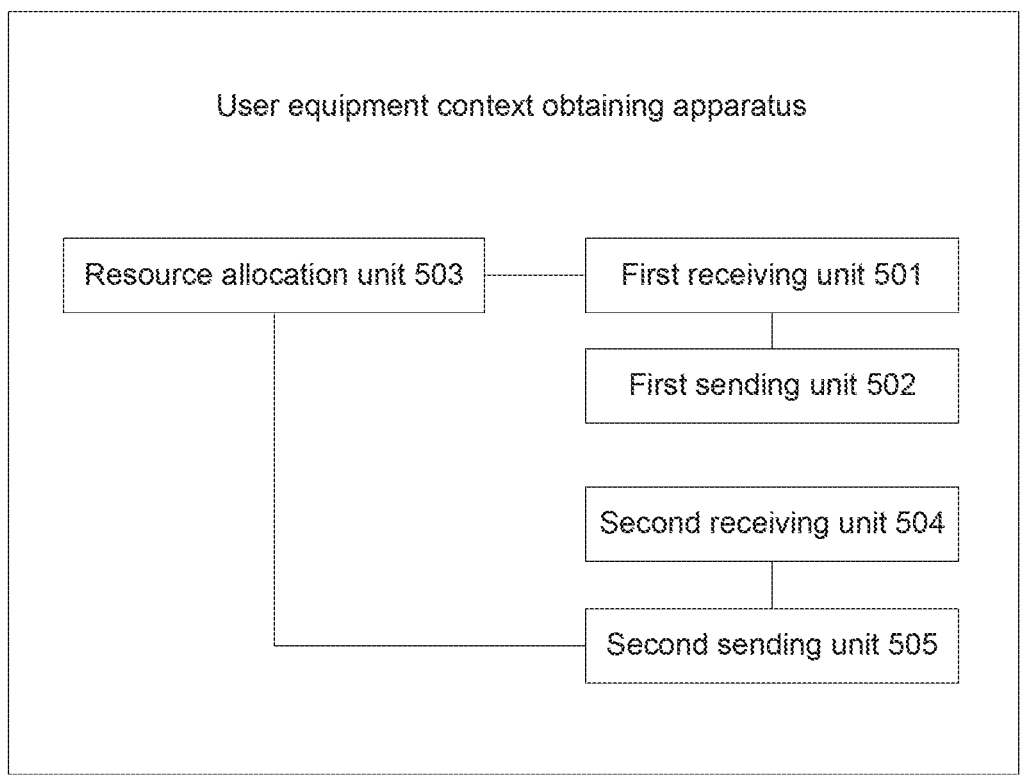
FIG. 5 is a second schematic structural diagram of a user equipment context obtaining apparatus according to an embodiment of the present invention.

FIG. 5 is a second schematic structural diagram of a user equipment context obtaining apparatus according to an embodiment of the present invention. As shown in FIG. 5, the apparatus includes a first receiving unit 501, configured to receive a user equipment context of a user equipment within a first network node and a user equipment context of the user equipment within a second network node sent by the first network node and a first sending unit 502, configured to send the user equipment context of the user equipment within the second network node to a fourth network node. In some embodiments, the first network node and the second network node are a master node and a secondary node in a first dual connectivity network respectively, and the third network node and the fourth network node are a master node and a secondary node in a second dual connectivity network respectively.

In an implementation, the apparatus further includes a resource allocation unit 503, configured to allocate a resource to the user equipment according to the user equipment context of the user equipment within the first network node, to obtain first resource configuration information. In some embodiments, the apparatus further includes a second receiving unit 504, configured to receive second resource configuration information sent by the fourth network node, where the second resource configuration information is obtained by the fourth network node by allocating a resource to the user equipment according to the user equipment context of the user equipment within the second network node. In some embodiments, the apparatus further includes a second sending unit 505, configured to send the first resource configuration information and the second resource configuration information to the first network node.

In the foregoing solution, the user equipment context obtaining apparatus may be applied to the side of the third network node. A person skilled in the art should understand that, the foregoing user equipment context obtaining apparatus according to the embodiments of the present invention may be understood with reference to related descriptions of the foregoing user equipment context obtaining method. In actual applications, functions of the units in the user equipment context obtaining apparatus may be implemented by modules with a processing function, for example, a processor.

When the user equipment context obtaining apparatus according to the embodiments of the present invention is implemented in the form of a software functional unit and sold or used as an independent product, the user equipment context obtaining apparatus may further be stored in a computer-readable storage medium. Based on such an understanding, the technical solutions of the embodiments of the present invention essentially, or the part contributing to the prior art may be implemented in the form of a software product. The computer software product is stored in a storage medium, and includes several instructions for instructing a computer device (which may be a personal computer, a server, a network device, or the like) to perform all or some of the methods described in the embodiments of the present invention. The foregoing storage medium includes any medium that can store program code, such as a USB flash drive, a removable hard disk, a read-only memory (ROM), a magnetic disk, or an optical disc. In this case, the embodiments of the present invention are not limited to any specific combination of hardware and software.

Correspondingly, the embodiments of the present invention further provide a computer storage medium, where the computer storage medium stores a computer executable instruction. The computer executable instruction, when executed by a processor, implements the foregoing user equipment context obtaining method according to the embodiments of the present invention.

Figure 6:
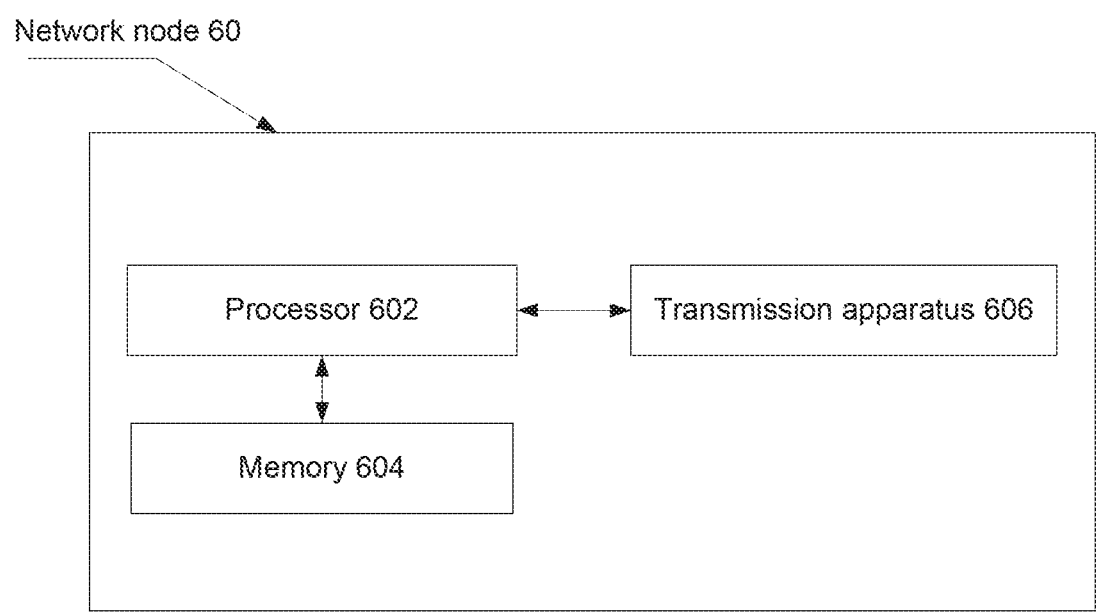
FIG. 6 is a schematic structural diagram of composition of a network node according to an embodiment of the present invention.

FIG. 6 is a schematic structural diagram of composition of a network node according to an embodiment of the present invention. As shown in FIG. 6, a network node 60 may include one or more (only one is shown in the drawing) processors 602 (the processor 602 may include, but is not limited to, a processing apparatus such as a micro controller unit (MCU) or a field programmable gate array (FPGA)), a memory 604 configured to store data, and a transmission apparatus 606 for a communication function. A person skilled in the art should understand that, the structure shown in FIG. 6 is merely an example, and does not limit a structure of the foregoing electronic apparatus. For example, the network node 60 may further include more or fewer components than those shown in FIG. 6, or have a configuration different from that shown in FIG. 6.

The memory 604 may be configured to store software programs and modules of application software, for example, program instructions/modules corresponding to the paging time determining method in the embodiments of the present invention, and the processor 1202 implements various functional applications and data processing by running the software programs and modules stored in the memory 604, that is, implementing the foregoing method. The memory 604 may include a high speed random access memory, and may further include a nonvolatile memory, for example, one or more magnetic storage apparatuses, a flash memory, or other nonvolatile solid-state memories. In some examples, the memory 604 may further include memories remotely disposed with respect to the processor 602, and the remote memories may be connected to the network node 60 through a network. Examples of the network include, but are not limited to, the internet, an intranet, a local area network, a mobile communications network and a combination of thereof.

The transmission apparatus 606 is configured to receive or send data through a network. Specific examples of the network may include a wireless network provided by a communications provider of the network node 60. In an example, the transmission apparatus 606 includes a network interface controller (NIC), which may be connected to other network devices through a base station to communicate with the internet. In an example, the transmission apparatus 606 may be a radio frequency (RF) module, which is configured to communicate with the internet in a wireless manner.

The technical solutions set forth in the embodiments of the present invention may be arbitrarily combined with each other without conflicts.

In the several embodiments provided in the present invention, it should be understood that the disclosed method and intelligent device may be implemented in other manners. The described device embodiment is merely an example. For example, the unit division is merely logical function division, and there may be other division manners during actual implementation. For example, a plurality of units or components may be combined or integrated into another system, or some features may be ignored or not performed. In addition, the displayed or discussed mutual couplings or direct couplings or communication connections between the components may be implemented through some interfaces. The indirect couplings or communication connections between the devices or units may be implemented in electronic, mechanical, or other forms.

The units described as separate parts may or may not be physically separate; parts displayed as units may or may not be physical units, and may be located in one position or distributed on a plurality of network units. Some or all of the units may be selected based on actual requirements to achieve the objectives of the solutions of the embodiments.

In addition, the functional units in the embodiments of the present invention may all be integrated into one second processing unit, or each of the units may be implemented as an independent unit, or two or more units may be integrated into one unit. The integrated unit may be implemented in a form of hardware, or may be implemented in a form of hardware with a software functional unit.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention.

What is claimed is:

1. A user equipment context obtaining method comprising:
   obtaining, by a first network node from a second network node, a user equipment context of a user equipment within the second network node; and
   sending, by the first network node, both a user equipment context of the user equipment within the first network node and the user equipment context of the user equipment within the second network node to a third network node, wherein
   the first network node and the second network node are a master node and a secondary node in a first dual connectivity network respectively, and the third network node is a master node in a second dual connectivity network.

2. The method of claim 1 wherein obtaining, by a first network node from a second network node, a user equipment context of a user equipment within the second network node comprises:
   obtaining, by the first network node, the user equipment context of the user equipment within the second network node from the second network node when the first network node determines that a user equipment handover needs to be triggered.

3. The method of claim 2 further comprising:
   receiving, by the first network node, a measurement report sent by the user equipment; and
   determining, by the first network node, whether the user equipment handover needs to be triggered based on the measurement report.

4. The method of claim 1 wherein obtaining, by a first network node from a second network node, a user equipment context of a user equipment within the second network node comprises:
   sending, by the first network node, a user equipment context request message to the second network node; and
   receiving, by the first network node, the user equipment context of the user equipment within the second network node sent by the second network node.

5. The method of claim 1 further comprising:
   receiving, by the first network node, first resource configuration information and second resource configuration information sent by the third network node; and
   sending, by the first network node, the first resource configuration information and the second resource configuration information to the user equipment, to trigger a user equipment handover.

6. The method of claim 5 wherein:
   the first resource configuration information is obtained by the third network node by allocating a resource to the user equipment according to the user equipment context of the user equipment within the first network node; and
   the second resource configuration information is obtained by a fourth network node by allocating a resource to the user equipment according to the user equipment context of the user equipment within the second network node, and the fourth network node is a secondary node in the second dual connectivity network.

7. A user equipment context obtaining apparatus comprising:
   a communications interface;
   a memory configured to store computer-executable instructions; and
   one or more processors in communication with the communications interface and the memory and configured to execute the computer-executable instructions to at least:
      obtain, via the communications interface, from a second network node, a user equipment context of a user equipment within the second network node; and send, by the communications interface, both a user equipment context of the user equipment within a first network node and the user equipment context of the user equipment within the second network node to a third network node, wherein
the first network node and the second network node are a master node and a secondary node in a first dual connectivity network respectively, and the third network node is a master node in a second dual connectivity network.

8. The apparatus of claim 7 where the communications interface is configured to obtain the user equipment context of the user equipment within the second network node from the second network node when it is determined that a user equipment handover needs to be triggered.

9. The apparatus of claim 8, wherein:
the communications interface is further configured to receive a measurement report sent by the user equipment; and
the computer-executable instructions further cause the one or more processors to determine whether the user equipment handover needs to be triggered based on the measurement report.

10. The apparatus of claim 7 wherein the communications interface is further configured to send a user equipment context request message to the second network node;
and receive the user equipment context of the user equipment within the second network node sent by the second network node.

11. The apparatus of claim 7 further comprising:
a second communications interface configured to:
receive first resource configuration information and second resource configuration information sent by the third network node; and
send the first resource configuration information and the second resource configuration information to the user equipment, to trigger a user equipment handover.

12. The apparatus of claim 11 wherein:
the first resource configuration information is obtained by the third network node by allocating a resource to the user equipment according to the user equipment context of the user equipment within the first network node; and
the second resource configuration information is obtained by a fourth network node by allocating a resource to the user equipment according to the user equipment context of the user equipment within the second network node, and the fourth network node is a secondary node in the second dual connectivity network.

13. A non-transitory computer-readable storage medium storing computer-executable instructions that, when executed by a computer system, configure the computer system to perform operations comprising:
obtaining, by a first network node from a second network node, a user equipment context of a user equipment within the second network node; and
sending, by the first network node, both a user equipment context of the user equipment within the first network node and the user equipment context of the user equipment within the second network node to a third network node, wherein
the first network node and the second network node are a master node and a secondary node in a first dual connectivity network respectively, and the third network node is a master node in a second dual connectivity network.

14. The non-transitory computer-readable storage medium of claim 13 wherein the obtaining, by a first network node from a second network node, a user equipment context of a user equipment within the second network node comprises:
obtaining, by the first network node, the user equipment context of the user equipment within the second network node from the second network node when the first network node determines that a user equipment handover needs to be triggered.

15. The non-transitory computer-readable storage medium of claim 14 further comprising:
receiving, by the first network node, a measurement report sent by the user equipment; and
determining, by the first network node, whether the user equipment handover needs to be triggered based on the measurement report.

16. The non-transitory computer-readable storage medium of claim 13 wherein the obtaining, by a first network node from a second network node, a user equipment context of a user equipment within the second network node comprises:
sending, by the first network node, a user equipment context request message to the second network node; and
receiving, by the first network node, the user equipment context of the user equipment within the second network node sent by the second network node.

17. The non-transitory computer-readable storage medium of claim 13 further comprising:
receiving, by the first network node, first resource configuration information and second resource configuration information sent by the third network node; and
sending, by the first network node, the first resource configuration information and the second resource configuration information to the user equipment, to trigger a user equipment handover, wherein:
the first resource configuration information is obtained by the third network node by allocating a resource to the user equipment according to the user equipment context of the user equipment within the first network node; and
the second resource configuration information is obtained by a fourth network node by allocating a resource to the user equipment according to the user equipment context of the user equipment within the second network node, and the fourth network node is a secondary node in the second dual connectivity network.

18. A user equipment context obtaining method comprising:
receiving, by a third network node, a user equipment context of a user equipment within a first network node and a user equipment context of the user equipment within a second network node that are sent by the first network node; and
sending, by the third network node, the user equipment context of the user equipment within the second network node to a fourth network node, wherein
the first network node and the second network node are a master node and a secondary node in a first dual connectivity network respectively, and the third network node and the fourth network node are a master node and a secondary node in a second dual connectivity network respectively.

19. The method of claim 18 further comprising:
allocating, by the third network node, a resource to the user equipment according to the user equipment context of the user equipment within the first network node, to obtain first resource configuration information;
receiving, by the third network node, second resource configuration information sent by the fourth network node, wherein the second resource configuration information is obtained by the fourth network node by allocating a resource to the user equipment according to the user equipment context of the user equipment within the second network node; and
sending, by the third network node, the first resource configuration information and the second resource configuration information to the first network node.

20. The method of claim 18 further comprising:
receiving, by the first network node, a measurement report sent by the user equipment; and
determining, by the first network node, whether a user equipment handover needs to be triggered based on the measurement report.

* * * * *